United States Patent
Walton

[15] 3,663,043
[45] May 16, 1972

[54] BALL AND SOCKET JOINT FOR PIPELINES

[72] Inventor: George W. Walton, 8903 Devonshire Drive, Dallas, Tex. 75209

[22] Filed: Jan. 2, 1970

[21] Appl. No.: 128

Related U.S. Application Data

[63] Continuation-in-part of Ser. No. 861,399, Sept. 26, 1969, abandoned.

[52] U.S. Cl..............................285/113, 285/94, 285/261, 285/264, 285/348, 285/379
[51] Int. Cl............................................................F16l 17/00
[58] Field of Search..............285/166, 167, 95, 96, 94, 261, 285/262, 263, 264, 265, 266, 267, 268, 269, 270, 271, 379, 113, 348

[56] References Cited

UNITED STATES PATENTS

| | | | |
|---|---|---|---|
| 1,795,155 | 3/1931 | White | 285/95 |
| 2,085,922 | 7/1937 | Moore | 285/266 |
| 2,519,147 | 8/1950 | Miller | 285/261 X |
| 2,081,040 | 5/1937 | King | 285/DIG. 11 |
| 3,314,697 | 4/1967 | Freeman | 285/263 |

FOREIGN PATENTS OR APPLICATIONS

| | | | |
|---|---|---|---|
| 206,781 | 7/1955 | Australia | 285/266 |
| 508,022 | 7/1920 | France | 285/261 |
| 603,187 | 1/1926 | France | 285/106 |
| 192,843 | 2/1923 | Great Britain | 285/266 |
| 1,158,358 | 7/1969 | Great Britain | 285/379 |

*Primary Examiner*—Dave W. Arola
*Attorney*—Hyer, Eickenroht & Thompson

[57] ABSTRACT

A ball and socket joint is disclosed that has a pressure energized seal that can seal against pressure differentials in either direction. In one embodiment, the ball portion is supported on roller bearings for ease of movement of the ball and socket members relative to each other. In another embodiment, the ball is engaged by trunnions that allow the rotation of the ball relative to the socket to be limited to a variety of axes or rotation.

14 Claims, 8 Drawing Figures

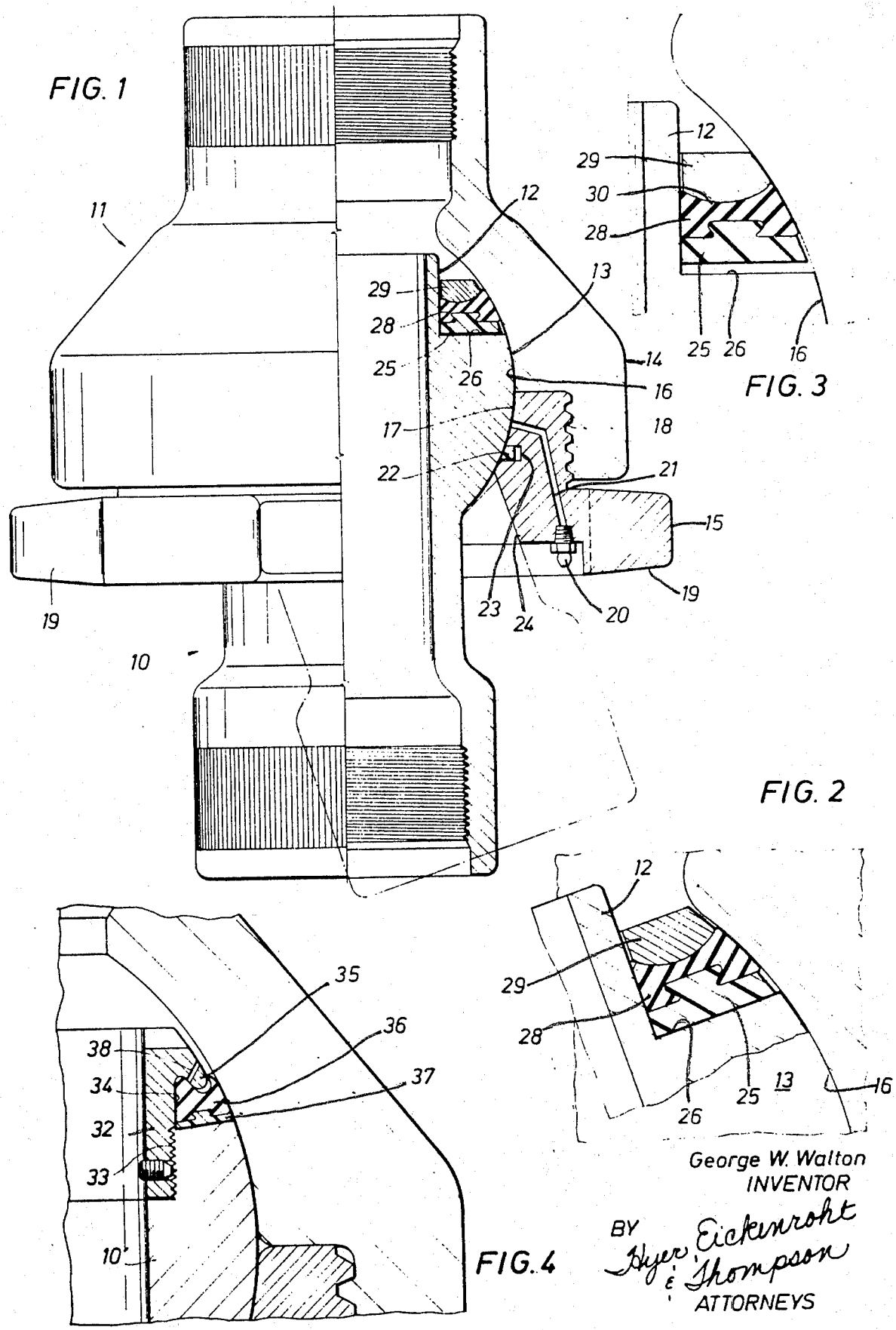

George W. Walton
INVENTOR

BY Hyer, Eickenroht
& Thompson
ATTORNEYS 3,663,043

BALL AND SOCKET JOINT FOR PIPELINES

This application is a continuation-in-part of patent application Ser. No. 861,399, filed Sept. 26, 1969 and entitled "Ball and Socket Joint for Pipelines" and now abandoned.

This invention relates to a ball and socket joint for pipelines.

One of the major problems with ball and socket joints heretofore is providing an adequate seal. Most ball and socket joints have compression type seals. This type seal is compressed sufficiently to maintain a seal against the highest expected differential across the joint. As the amount of compression in the seal increases, the force required to move the ball relative to the socket and vice versa is increased and at pressures less than the highest anticipated is in excess of what is necessary. Ideally then a ball and socket joint should have a seal that is energized by the pressure differential existing across it. In this way, the compressive force in the seal is directly proportional to the pressure differential across the seal and the force required to move the seal, while under a pressure differential, is also directly proportional to the pressure differential. Thus, while operating at intermediate or low pressure differentials, the ball and socket joint could be moved freely and with substantially less wear on the seal element itself.

It is an object of this invention to provide a ball and socket joint having an improved pressure energized seal.

It is a further object of this invention to provide a ball and socket joint for pipelines that has a pressure energized seal that will maintain a seal against a pressure differential acting in either direction across the seal.

Certain oil and gas wells are subjected to pressure high enough to break down the producing formation in an effort to increase production. The pressure builds up until the formation fractures, then the pressure drops rapidly, often dropping below atmospheric at the surface. This sudden change in the direction of the pressure differential is very hard on seals, most of which are not designed to handle pressure differentials from both directions. Therefore, it is a further object of this invention to provide a pipeline ball and socket joint of generally improved construction and design that will maintain a seal against high pressure in one direction and will also maintain a seal when the pressure in the pipeline drops rapidly to below atmospheric.

It is an additional object of this invention to provide a pipeline ball and socket joint of improved design in which the ball is supported on antifriction bearings that permit the ball to rotate axially and to pivot out of axial alignment with the socket, while being supported by the antifriction bearing.

In certain installations where ball and socket joints are used, it is desirable to be able to control the axis or axes around which the ball can rotate relative to the socket. Therefore, it is another object of this invention to provide a ball and socket joint that can be adjusted to allow the ball to move relative to the socket around one or more selected axes, only.

It is another object of this invention to provide a ball and socket joint that can be adjusted from a joint wherein the ball can rotate relative to the ball around one axis to a joint wherein the ball can rotate around either one of two additional axes, or to a joint wherein the ball can rotate around a plurality of axes in the conventional manner.

These and other objects, advantages, and features of the invention will be apparent to those skilled in the art from a consideration of this specification including the attached drawings and appended claims.

In the drawings:

FIG. 1 is a view, partially in elevation and partially in vertical section, through one embodiment of the ball and socket joint of this invention;

FIGS. 2 and 3 are enlarged sectional views through the seal means of the ball and socket joint of FIG. 1;

FIG. 4 is an alternate embodiment of the seal arrangement;

Figure 5:
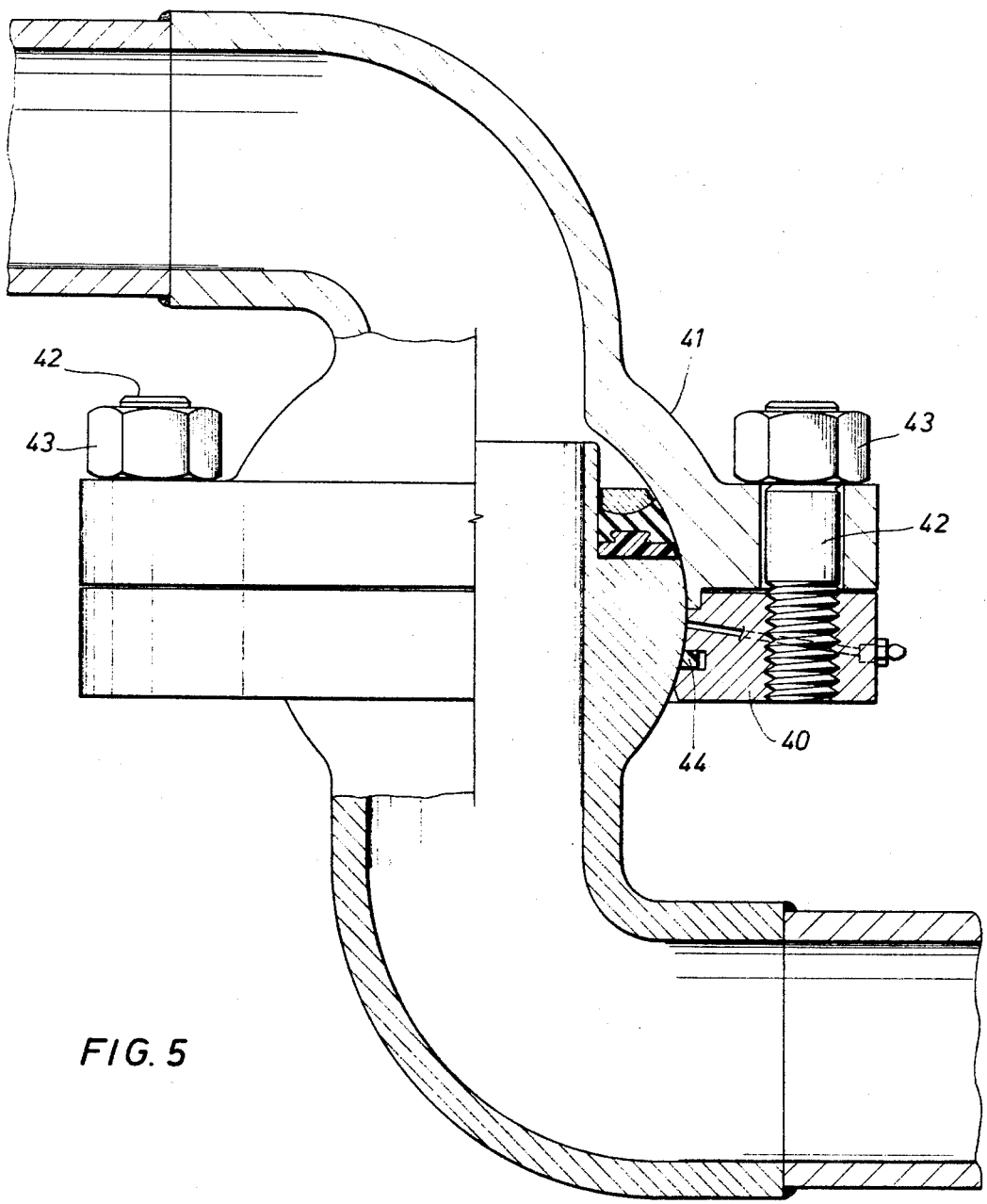
FIG. 5 is a view, also partially in elevation and partially in vertical section of another embodiment of the ball and socket joint of this invention.

The embodiment shown in FIG. 1 includes tubular ball member 10 and tubular socket member 11. Ball member 10 has cylindrical outer surface 12 adjacent one end and spherical outer surface 13 adjacent the cylindrical surface.

Socket member 11 includes hub 14 and ball retaining member 15. Hub 14 has internal spherical surface 16 and ball retaining member 15 has spherical inner surface 17. Both of these surfaces have the same diameter and are of the same curvature as surface 13 of ball member 10. Therefore, spherical surfaces 16 and 17 form a spherical pocket in socket member 11 that will receive and rotatably support spherical surface 13 on the ball member.

In the embodiment shown in FIG. 1, ball retaining member 15 is connected to hub 14 by threaded connection 18. The ball retaining member is provided with hammer lugs 19 for ease in tightening and loosening this threaded connection. Grease is supplied between the spherical surfaces on the socket and the ball through grease fitting 20 and passageway 21. Grease retaining ring 22 is located in annular groove 23 in the ball retaining member to help hold the grease between the spherical surfaces of the socket and the ball.

With the ball and socket member assembled, as shown in FIG. 1, the ball and socket members can rotate relative to each other 360° or more in either direction around their longitudinal axes, the two members can pivot out of axial alignment through an angle determined by how far the ball member can move before it engages inclined surface 24 on ball retaining member 15. This distance can be varied depending upon the construction used and the service in which the joint is to be used.

Pressure energized seal means are carried by the ball for preventing the flow of fluid out of or into the tubular ball and socket members, i.e., between the inside and outside of the members. The seal means includes annular seal retaining member 25, which encircles cylindrical surface 12 and is located adjacent spherical surface 13. It is positioned to engage annular shoulder 26 between the cylindrical surface and the spherical surface on the ball. Preferably, this member is made of a material such as teflon that has some rigidity but which is also a good bearing material. Rigidity is required for as will be explained later on, this member helps hold seal member 27 in position, particularly when the pressure differential is from the outside of the line in, as when the pressure in the pipeline drops below atmospheric.

Seal member 28 is an annular member or ring of resilient elastomeric material, such as rubber. It also encircles cylindrical surface 12 and is positioned adjacent seal retaining member 25. The seal ring and the seal retaining member are attached to each other. In the embodiment shown, a tongue and groove type connection is provided. Actually, the tongue and groove type connection plus a bonding of the rubber to the teflon during the molding process would be preferred.

Completing the assembly is follower ring 29. This ring is made of rigid material, such as steel. Preferably, seal member 28 has a convex surface to provide outer edges that form pressure energized lip seals with cylindrical surface 12 and spherical surface 16 on the socket. Also, preferably surface 30 on the follower ring that engages the seal member is of the same configuration but convex to mate with the concave surface on the seal ring.

Follower ring 29 has some clearance between cylindrical surface 12 and spherical surface 16 of the socket member. This clearance, however, should be such that this ring will engage spherical surface 16 and limit the distance the seal member and the seal retaining member can move along the cylindrical surface when it is subjected to a pressure differential from the exterior of the line toward the interior. In FIG. 3, follower ring 29 has engaged surface 16 and is holding seal member 28 in sealing engagement with the cylindrical and spherical surfaces and supporting it against the pressure differential existing across the rubber.

Seal retaining member 25 preferably has clearance between its inner surface and cylindrical surface 12 so that rotation of the ball in the socket will cause relative rotation between cylindrical surface 12 and the seal assembly. In other words, the seal assembly will generally tend to remain stationary relative to the spherical surface and all relative rotation or relative movement will occur along cylindrical surface 12, i.e., between the ball member and the seal member assembly. This is advantageous since it reduces the area of the seal exposed to the wear of relative rotation.

FIG. 4 shows an alternate embodiment of the joint. Here annular member 32 is connected to ball member 10' by threads 33. Member 32 provides cylindrical surface 34 and has outwardly extending flange 35 to serve as a follower ring for the seal assembly. The seal assembly consists of seal member 36 and seal retainer ring 37 both constructed substantially the same as seal member 28 and retainer ring 25 described above. A plurality of holes 38 are provided in flange 35 to permit the fluid from the pipeline to flow directly against the inner pressure energized lip of seal ring 36.

In FIG. 5, the ball and socket members are of substantially the same internal construction as in FIG. 1, except that ball retaining member 40 is connected to socket member 41 by studs 42 and nuts 43. Ring 44 serves as a grease retaining ring in the same manner as did ring 22 in FIG. 1.

Figure 6:
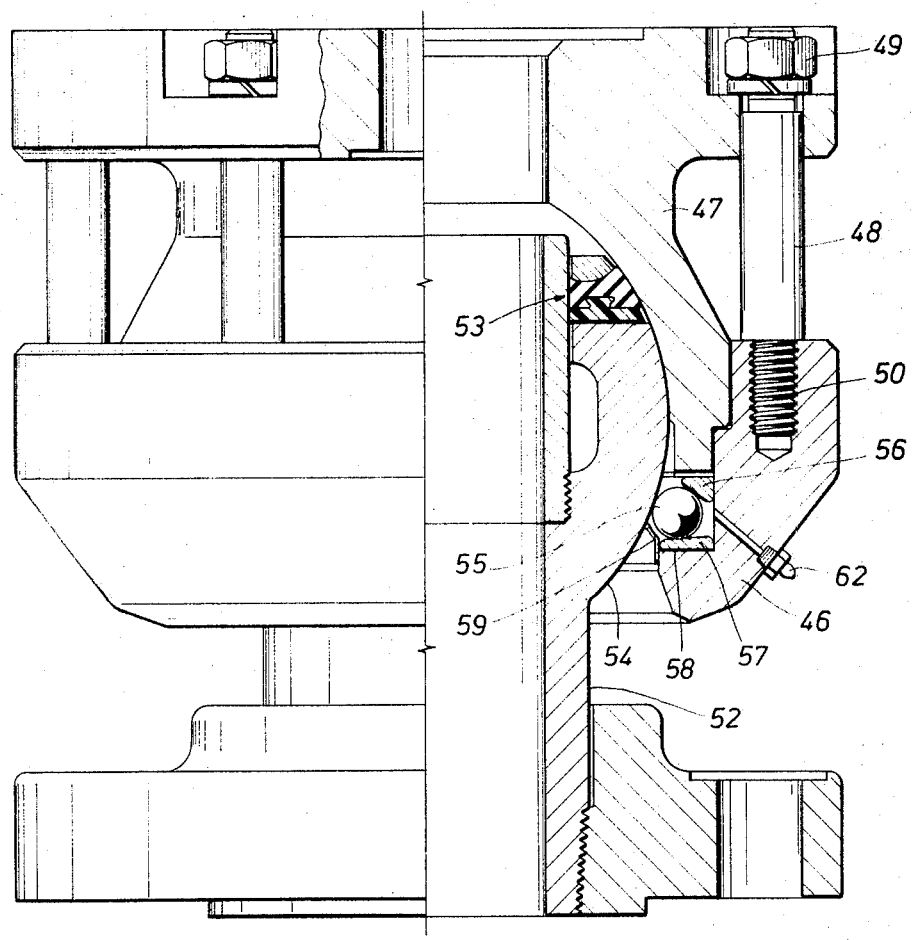
FIG. 6 is a view partially in elevation and partially vertical section of yet another embodiment of the joint of this invention.

In FIG. 6, ball retaining member 46 is connected to hub 47 by bolts 48 and nuts 49. Bolts 48 are connected to ball retaining member 46 by tapped holes 50. The configuration of ball member 52 is generally the same as that shown in FIG. 1. The same is true of the seal assembly, generally indicated by the number 53. In this embodiment however, spherical surface 54 of ball 52 is engaged and supported by a plurality of balls 55. These balls, besides engaging spherical surface 54, roll on upper race 56 and lower race 57. These two races and the balls are positioned to be supported by upwardly facing shoulder 58 on the ball retaining member. Wire retainer 59 holds the balls in place between the two races.

After ball member 52 is inserted through the opening in hub 47 and ball retaining member 46 is bolted into place, balls 55 are trapped and will support the ball member for rotation relative to the socket assembly both around its longitudinal axis and when it pivots out of axial alignment with the socket member. Appropriate means 62 can be provided for lubricating the balls as they rotate between races 56 and 57 and spherical surface 54 of the ball member.

Figure 7:
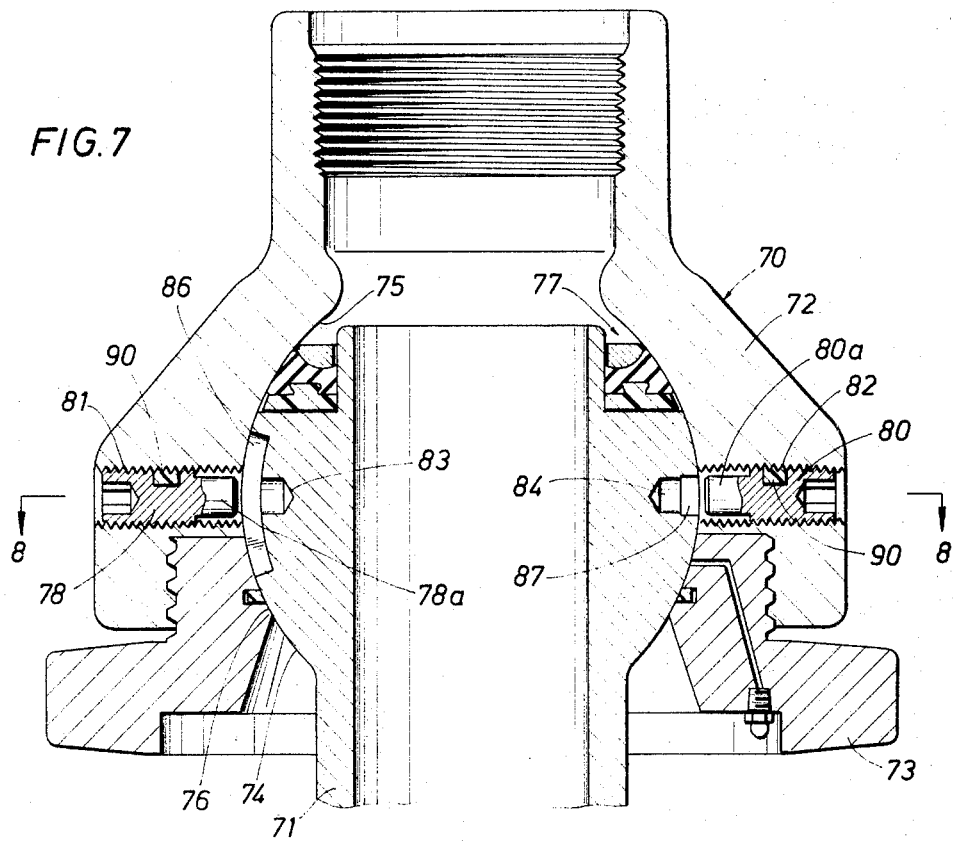
FIG. 7 is a sectional view of another embodiment of the ball and socket joint of this invention.
Figure 8:
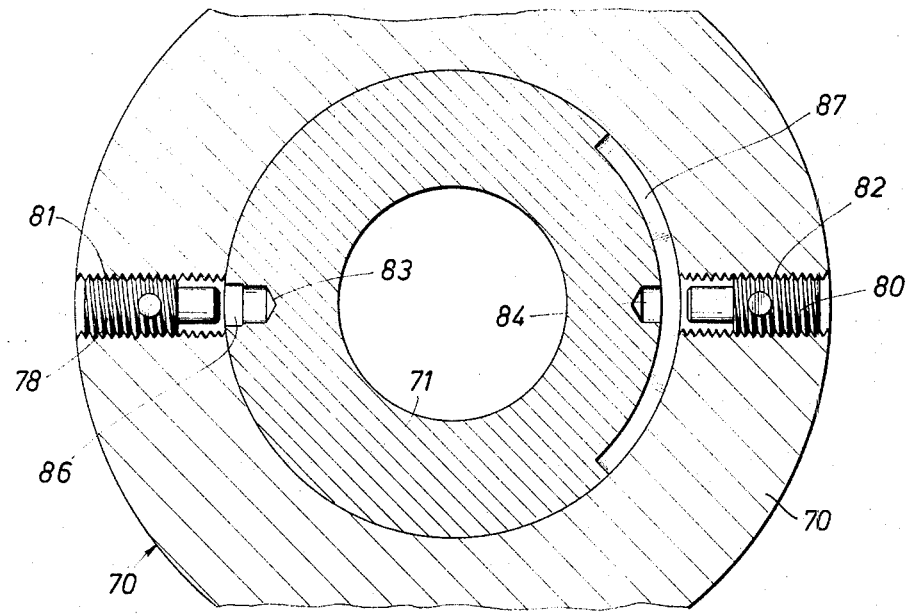
FIG. 8 is a sectional view of the embodiment of FIG. 7 taken along line 8—8.

Another alternate embodiment of the invention is shown in FIGS. 7 and 8. This joint includes socket member 70 and ball member 71. The socket member comprises hub 72 and ball retaining member 73. Ball member 71 has spherical surface 74 that engages spherical surfaces 75 and 76 on hub 72 and ball retaining member 73, respectively. The construction of the ball and socket joint shown in these figures is generally the same as that described above in connection with FIG. 1, including seal means 77 which is positioned between a cylindrical surface on the end of the ball member and the spherical surface of hub 72.

In this embodiment, means are provided that are movable between a first position for releasably holding the ball member for limited movement relative to the socket member around one axis and a second position to release the ball member for at least limited movement relative to the socket member around at least one other axis. In the embodiment shown, said means includes trunnions 78 and 80. The trunnions are located in tapped holes 81 and 82, respectively, in hub 72. A portion of each trunnion is threaded to engage the threads in the tapped holes. Rotation of the trunnions then, as for example by an Allen head wrench in the type trunnion shown in the drawing, will cause the trunnions to move axially relative to openings 81 and 82. End portions 78a and 80a of the trunnions are turned to a diameter such that they will enter and snugly fit openings 83 and 84, respectively, located in the spherical surface of ball member 71 on diametrically opposite sides thereof. By rotating the trunnions so that end portions 78a and 80a are in engagement with openings 83 and 84, ball member 71 can move relative to socket member 70 only around an axis that coincides with the longitudinal axes of the trunnions. This axis along with the axes of the trunnions must, of course, intersect the center of the radius of curvature of the spherical surfaces on the ball and socket for such rotation to occur. This position of the trunnions will be referred to hereinafter as the first position.

It is another feature of this invention that the trunnions can be moved axially to another or second position wherein the ball is provided with at least one additional axis around which to rotate. In the embodiment shown, spherical surface 74 of ball member 71 is provided with two elongated grooves or slots 86 and 87. The grooves or slots 86 and 87 are rotated relative to each other by 90°. As will be seen below, this is to provide a selection in the additional axis of rotation to be provided to the ball relative to the socket member, but it is understood that the slots can be arranged to extend in the same direction, if desired.

With the slots formed, as shown, by moving one trunnion member to a second position, wherein its outer end is in engagement only with the slot and by removing the other trunnion member out of engagement completely with the ball. The ball can continue to rotate around the axis of the one trunnion, but it also can move around an axis perpendicular to the axis of the trunnion to the extent allowed by the slot engaged by the trunnion. For example, if trunnion 78 has its outer end in engagement with slot 86 and trunnion 80 is completely out of engagement with the ball member, then the ball member can rotate about an axis perpendicular to the drawing in FIG. 7 in either direction until one end of slot 86 engages the outer end of the trunnion. The ball can continue to rotate around the longitudinal axis of the trunnion to the extent allowed by the construction of the joint.

In the same manner, by moving trunnion 78 out of engagement with the ball and moving trunnion 80 to its second position with its end portion 80a in engagement with slot 87, ball member 71 can rotate axially to the extent allowed by the length of slot 87, as shown in FIG. 8. It can also continue to rotate around the axis of trunnion 80 to the extent allowed by the construction of the joint. By moving both trunnions out of engagement with the ball, the ball has the same freedom of movement as does the ball in the embodiment shown in FIG. 1, The trunnions are shown in the drawings in this position.

To help hold each trunnion in the desired position, preferably portion 90 of nylon is compressed by the threads of the tapped hole to increase the friction to help hold the threaded member against movement relative to the tapped hole due to vibrations. Other locking means could also be used, such as a jam nut.

From the foregoing description of one embodiment of this invention by way of example, it will be seen that this invention is one well adapted to attain all of the ends and objects hereinabove set forth, together with other advantages which are obvious and which are inherent in the apparatus and structure.

The invention having been described, what is claimed is:

1. A ball and socket joint for a pipeline comprising a tubular ball member having a cylindrical outer surface adjacent one end and a spherical outer surface adjacent the cylindrical surface with a radially extending, generally flat annular surface connecting the two, a tubular socket member for receiving the end of the ball member having the cylindrical and spherical outer surfaces, said socket member including a hub having an inner spherical surface for mating with the spherical surface of the ball member and a ball retaining member having a spherical inner surface for mating with the spherical surface of the ball member, means connecting the ball retaining member to the hub to hold the ball in position with its outer spherical surface adjacent the spherical surfaces of the hub and the retaining member, while allowing the ball member and socket member to freely rotate axially relative to each other and to pivot out of axial alignment with each other a limited predetermined amount, and pressure energized seal means carried by the ball for preventing the flow of fluid between the inside and outside of the joint in either direction, said seal means including an annular seal retaining means of relatively rigid material having good bearing qualities encircling the cylindrical surface in position to engage the annular shoulder between the two surfaces and reduce the frictional forces tending to urge the seal means to rotate with the ball member, said retaining member having a radial width such that its outer surface is adjacent to the inner spherical surface of the hub and ball retaining members, a seal member of resilient elastomer material encircling the cylindrical surface and positioned adjacent the seal retaining member, means connecting the seal member to the seal retaining member to permit the retaining member to restrain the movement of the seal member away from the retaining member toward the end of the ball member, said seal member being compressed between and in sealing engagement with the cylindrical surface on the ball member, and the spherical surface on the socket member, and a follower ring encircling the cylindrical outer surface of the ball member between the seal ring and the end of the ball member, said follower ring having an outside diameter such that it will engage the spherical inner surface of the socket member and support the seal member in sealing engagement with the cylindrical surface of the ball member and the spherical surface of the socket member when the external pressure exceeds the internal pressure of the pipeline in which it is located.

2. The ball and socket joint of claim 1 in which the surface of the seal member away from the retaining member is concave and the follower ring is provided with a convex surface that mates generally with and engages the concave surface of the seal member.

3. The joint of claim 1 further provided with ball bearing means carried by the ball retaining member for holding the ball member in the socket member and for supporting the ball member for rotation axially relative to the socket member and for said limited pivotal movement out of axial alignment.

4. The joint of claim 1 in which the seal retaining member is made of teflon.

5. The joint of claim 1 in which the seal retaining member and the seal member are connected by a tongue and groove joint.

6. A ball and socket joint for a pipeline comprising a tubular ball member having a spherical outer surface, a tubular socket member including a hub having an inner spherical surface for mating with the spherical surface of the ball member and a ball retaining member having a spherical inner surface for mating with the spherical surface of the ball member, means connecting the ball retaining member to the hub to hold the ball in position with its outer spherical surface adjacent the spherical surfaces of the hub and the retaining member, seal means positioned between the ball member and the socket member for preventing the flow of fluid between the inside and outside of the joint, and means releasably holding the ball member for movement relative to the socket member around one axis including two trunnion members each positioned in one of two openings formed in the spherical surface of one of the ball member and socket member, said openings being diametrically opposed with their longitudinal axes in alignment, said trunnion members being movable axially into second diametrically opposed openings formed in the other member to hold said ball member for movement relative to the socket member only around an axis coinciding with the longitudinal axes of said trunnion members, said trunnion members being movable axially out of engagement with the openings in one of said members to release the ball member for at least limited movement relative to the socket member around at least one other axis.

7. The ball and socket joint of claim 6 further provided with an elongated slot formed on the spherical surface of one of said members and intersecting one of the openings in said surface to permit the trunnion engageable with the opening to be moved axially out of said opening into said slot and the other trunnion member to be moved axially out of engagement with one of the ball member and socket member to allow limited rotation of the ball member relative to the socket member around an axis perpendicular to the longitudinal axis of the trunnion within the limits of the slot engaged by the trunnion.

8. The ball and socket joint of claim 6 further provided with a second slot that is located and formed in the spherical surface of one of said members and that intersects the other opening in said member, said second slot being positioned to permit the trunnion engageable with the opening intersected by said second slot to be moved axially out of said opening into said slot and the other trunnion member to be moved axially out of engagement with one of the ball member and socket member to allow limited rotation of the ball member relative to the socket member around an axis perpendicular to the longitudinal axis of the trunnion within the limits of the second slot, said second slot being positioned to permit said movement around an axis that is different from the axis around which movement is allowed by the first slot.

9. The ball and socket joint of claim 8 in which the axes of rotations allowed by the two slots are perpendicular.

10. The ball and socket joint of claim 9 in which the slots are formed in the spherical surface of the ball member.

11. The ball and socket joint of claim 10 in which the holes in the socket member are threaded and the trunnion members are equipped with engaging threads so that rotation of the trunnion members move them axially into and out of engagement with the openings and slots in the ball member.

12. A ball and socket joint for a pipeline comprising a tubular ball member having a cylindrical outer surface adjacent one end and a spherical outer surface adjacent the cylindrical surface with a radially extending generally flat annular surface connecting the two, a tubular socket member for receiving the end of the ball member having the cylindrical and spherical outer surfaces, said socket member including a hub having an inner spherical surface for mating with the spherical surface of the ball member and a ball retaining member having a spherical inner surface for mating with the spherical surface of the ball member, means connecting the ball retaining member to the hub to hold the ball in position with its outer spherical surface adjacent the spherical surfaces of the hub and the retaining member, while allowing the ball member and socket member to freely rotate axially relative to each other and to pivot out of axial alignment with each other a limited predetermined amount, and pressure energized seal means carried by the ball for preventing the flow of fluid between the inside and outside of the joint, said seal means including an annular seal retaining member of relatively rigid material encircling the cylindrical surface of the ball member and located adjacent the spherical surface in position to engage the annular shoulder between the two surfaces, said retaining member having a radial width such that its outer surface is adjacent to the inner spherical surface of the hub and ball retaining members, a seal member of resilient elastomer material encircling the cylindrical surface and positioned adjacent the seal retaining member, means connecting the seal member to the seal retaining member to permit the retaining member to restrain the movement of the seal member away from the retaining member toward the end of the ball member, said seal member having inner and outer edges that are moved into sealing engagement with the adjacent cylindrical and spherical surfaces respectively when a pressure differential exists across the seal members and means movable between a first position for releasably holding the ball member for movement relative to the socket member around one axis and a second position to release the ball member for at least limited movement relative to the socket member around at least one other axis.

13. A ball and socket joint for a pipeline comprising a tubular ball member having a spherical outer surface, a tubular socket member including a hub having an inner spherical surface for mating with the spherical surface of the ball member and a ball retaining member having a spherical inner surface for mating with the spherical surface of the ball member, means connecting the ball retaining member to the hub to hold the ball in position with its outer spherical surface adjacent the spherical surfaces of the hub and the retaining member, seal means positioned between the ball member and the socket member for preventing the flow of fluid between the inside and outside of the joint, a trunnion member positioned in an opening formed in one of said ball member and socket member and movable axially between a first position in engagement with an opening formed in the other member to hold said ball member for movement relative to the socket member only around the longitudinal axis of said trunnion member, a second position out of said opening into engagement with a slot formed in said member to allow angular movement of the axis of rotation of the ball around the longitudinal axis of the trunnion to be changed within the limits defined by the slot, and a third position out of said slot and opening to release the ball member for at least limited movement relative to the socket member around at least one other axis.

14. The ball and socket joint of claim 13 in which the slot is in the spherical surface of the ball member.

* * * * *